(12) United States Patent
Roberts-Haritonov et al.

(10) Patent No.: US 7,758,051 B2
(45) Date of Patent: Jul. 20, 2010

(54) GAS SEAL ASSEMBLY

(75) Inventors: Lev Uryevitch Roberts-Haritonov, Staines (GB); Julian Oliver Reed, Haslemere (GB)

(73) Assignee: AES Engineering Ltd, Rotherham (GB)

( * ) Notice: Subject to any disclaimer, the term of this patent is extended or adjusted under 35 U.S.C. 154(b) by 0 days.

(21) Appl. No.: 11/568,483

(22) PCT Filed: Apr. 26, 2005

(86) PCT No.: PCT/GB2005/001582
§ 371 (c)(1),
(2), (4) Date: Oct. 30, 2006

(87) PCT Pub. No.: WO2005/106295
PCT Pub. Date: Nov. 10, 2005

(65) Prior Publication Data
US 2007/0222160 A1   Sep. 27, 2007

(30) Foreign Application Priority Data
Apr. 30, 2004   (GB) ................................. 0409665.7

(51) Int. Cl.
*F16J 15/34* (2006.01)
(52) U.S. Cl. .................. 277/401; 277/400; 277/408
(58) Field of Classification Search .............. 277/400, 277/401, 408
See application file for complete search history.

(56) References Cited
U.S. PATENT DOCUMENTS 2,036,308 A * 4/1936 Vroom ................... 277/389
2,069,999 A * 2/1937 Clade ................... 137/246.17
2,907,594 A * 10/1959 Macks ..................... 277/401
2,921,805 A * 1/1960 Shevchenko ............ 277/365
2,925,290 A * 2/1960 Greenwald ............... 277/388
3,410,565 A * 11/1968 Williams ................. 277/348
3,433,489 A * 3/1969 Wiese ...................... 277/401

(Continued)

FOREIGN PATENT DOCUMENTS
EP   0961059   12/1999

(Continued)

*Primary Examiner*—Alison K Pickard
(74) *Attorney, Agent, or Firm*—Chernoff, Vilhauer, McClung & Stenzel

(57) ABSTRACT

A gas seal assembly includes a pair of mutually rotatable sealing members, each of which has a front face adjacent a gap between the two members which constitutes a leakage path through the seal assembly. The two sealing member are urged, in use, in a direction to close the gap and a gas bleed arrangement is provided for allowing gas from a high pressure side of the seal to bleed into the gap so as to apply a force tending to separate the members. The gas bleed arrangement includes a bore extending between the front face and a rear face of one of the sealing members, a generally radial groove formed in the rear face of the sealing member and a plate overlying the rear face to cover the groove and thereby define between the rear face of the sealing member and the plate a bleed passage connecting the bore to the high pressure side of the seal. The plate is formed as a shim that is sufficiently flexible to be deflected by the gas pressure into mating contact with the rear face of the sealing member so as to confine the gas flow of the bleed passage to the radial groove.

11 Claims, 2 Drawing Sheets

U.S. PATENT DOCUMENTS

| | | | |
|---|---|---|---|
| 3,804,424 A * | 4/1974 | Gardner | 277/360 |
| 3,917,289 A * | 11/1975 | Ivanov et al. | 277/400 |
| 4,523,764 A * | 6/1985 | Albers et al. | 277/400 |
| 4,613,141 A * | 9/1986 | Heinen | 277/359 |
| 4,908,081 A * | 3/1990 | Heinrich et al. | 156/89.25 |
| 4,990,054 A * | 2/1991 | Janocko | 415/111 |
| 5,133,562 A * | 7/1992 | Lipschitz | 277/400 |
| 5,516,118 A * | 5/1996 | Jones | 277/400 |
| 5,769,604 A * | 6/1998 | Gardner et al. | 415/170.1 |
| 6,135,458 A | 10/2000 | Fuse | |
| 6,155,572 A * | 12/2000 | Wu et al. | 277/348 |
| 6,213,473 B1 * | 4/2001 | Lebeck | 277/399 |
| 6,494,460 B2 * | 12/2002 | Uth | 277/399 |
| 6,557,856 B1 * | 5/2003 | Azibert et al. | 277/401 |
| 7,044,470 B2 * | 5/2006 | Zheng | 277/400 |
| 2001/0010416 A1 * | 8/2001 | Wu et al. | 277/387 |
| 2002/0079648 A1 * | 6/2002 | Uth | 277/401 |
| 2004/0232622 A1 | 11/2004 | Gozdawa | |

FOREIGN PATENT DOCUMENTS

| | | |
|---|---|---|
| GB | 2375148 | 11/2002 |
| JP | 06101766 A * | 4/1994 |

* cited by examiner

GAS SEAL ASSEMBLY

This is a national stage application filed under 35 USC 371 based on International Application No. PCT/GB2005/001582 filed Apr. 26, 2005, and claims priority under 35 USC 119 of United Kingdom Patent Application No. 0409665.7 filed Apr. 30, 2004.

This invention relates to a non-contacting gas seal assembly for restricting leakage of a fluid about a shaft extending through a housing, such as a turbine or a compressor and in particular gas under low and high pressures.

Rotary fluid film seals, also known as non-contacting face seals are usually applied to high speed rotating equipment, where the use of ordinary mechanical contacting face seals is not possible due to excessive heat generation and very rapid wear leading to catastrophic failure. Non-contacting gas seals are also known as dry gas seals or more simply as gas seals.

The operation of gas seals relies on a thin film of gas being generated between the two sealing faces; one of which rotates and the other is stationary. The gas film keeps the two sealing faces apart, by maintaining a very small gap between them, thus providing a sealing restriction and avoiding undesirable face contact during operation. At the same time, the gas film cools and lubricates the seal. The sealing gas can either be the process gas from the machine onto which the gas seal is fitted, such as a compressor or a turbine, or it can be supplied form an external source elsewhere in the plant installation.

There are a number of ways of accomplishing non-contacting operation. One of the most common includes the application of shallow spiral grooves pattern to one of the faces to generate some hydrodynamic lift and thereby separate the sealing faces. The sealing faces are normally flat and smooth. The face area between the sealing faces is normally called the sealing interface or sealing zone and the clearance between the two that is created and maintained for non-contacting operation is known as the sealing gap or sealing clearance.

Separation is achieved by allowing sealing fluid into the sealing gap. In the case of the spiral grooves this is achieved by the grooves pumping the gas in when the face rotates. Separation can also occur due to pressure differential alone. As gas enters the restriction, pressure builds up. This generates a separation force, forcing the two faces apart.

Particularly critical to seal operation are the start-up and shutdown conditions. It is under these conditions that the sealing gap in a conventional spiral groove is at its minimum and the risk of sealing face contact is at its greatest. It is therefore important to be able to achieve full sealing face separation at very low fluid sealing pressures and low rotational speeds while still maintaining robust non-contacting operation under all other duty parameters within the specified design operating range.

It is known to provide gas under pressure to the sealing gap to maintain sealing face separation at low rotational speeds through a gas bleed arrangement which includes a throttled passage that opens into the sealing gap. EP-0 961 059 teaches supplying sealing gas from an external pressurised supply.

GB 2 375 148, discloses a gas seal assembly, as set out in the preamble of claim 1. The seal assembly comprises a pair of mutually rotatable sealing members, each of which has a front face adjacent a gap between the two members which constitutes a leakage path through the seal assembly, the members being urged, in use, in a direction to close the gap. A gas bleed arrangement is provided to allow gas from a high pressure side of the seal to bleed into the gap so as to apply a force tending to separate the members. The gas bleed arrangement comprises a bore extending between the front face and a rear face of one of the sealing members, a generally radial groove formed in the rear face of the sealing member, and a plate overlying the rear face to cover the groove and thereby define between the rear face of the sealing member and the plate a bleed passage connecting the bore to the high pressure side of the seal.

By "generally radial" it is only meant that the groove should have a radial component to connect the rear end of the bore to the high pressure side of the seal. Thus the groove could be a spiral groove.

The intended purpose of a gas seal assembly is to prevent uncontrolled escape of gas from the high pressure side of the seal. Because non-contacting operation is achieved in a gas seal by paradoxically allowing some gas to bleed out to maintain a gap between two sealing members, it is important for the bleed passage which feeds gas to the gap in order to keep the sealing members apart to be heavily throttled to permit only a controlled amount of leakage. In practice, this requires a bleed passage of very small cross-section, its width being typically only a few microns.

In GB 2 375 148, a bleed passage is produced by forming one or more radial grooves in the rear face of the sealing member and covering the rear face with a separate rigid plate. However, if it is the grooves that are to dictate the controlled leakage, it is essential for the clearance between the plate and rear face of the sealing member to be significantly smaller that the grooves. Machining the rigid plate and the rear face of the sealing member to such high tolerances, both in terms of surface finish and flatness is difficult and costly to achieve.

With a view to mitigating the foregoing problem, the plate in the present invention is formed as a shim that is sufficiently flexible to be deflected by the gas pressure into mating contact with the rear face of the sealing member so as to confine the gas flow of the bleed passage to the radial groove.

The flexibility of the shim removes the need for it and the rear face of the sealing member to be perfectly flat as the shim can deflect to take up any inaccuracy in the flatness of the rear face of the sealing member.

It is preferred to urge the shim resiliently against the rear face of the sealing member. A metal spring energised polymer or o-ring may be positioned for this purpose behind the sealing shim in an open groove. Under low pressure operation, the spring force is sufficient to maintain the plate in contact with the rear face of the sealing member. At elevated pressures, the process gas can be used to clamp the two components together thus maintaining the bleed passage geometry under all operating conditions.

Usually, to achieve an even distribution of the bleed gas over the sealing gap, a gas seal will include several bleed passages, each comprising an axial bore and a radial groove in the rear face of the sealing member. From the axial bores, the gas is preferably distributed over the sealing gap by a series of distribution grooves at predetermined position.

The front distribution groove geometry may comprise a series of periodic circumferential grooves. Alternatively, the distribution grooves may be joined together in a continuous circumferential groove at a given diameter.

The seal design is hydrostatic in its nature of operation. If desired additional hydrodynamic elements may be added by a series of radial or angled grooves in the front face of one of the sealing members.

The invention will now be described further, by way of example, with reference to the accompanying drawings, in which:

FIG. 1 is an axial section through a gas seal module designed to seal gases across a range of pressures, from 15 to about 450 bar, in a pump, compressor or turbine housing.

Figure 1:
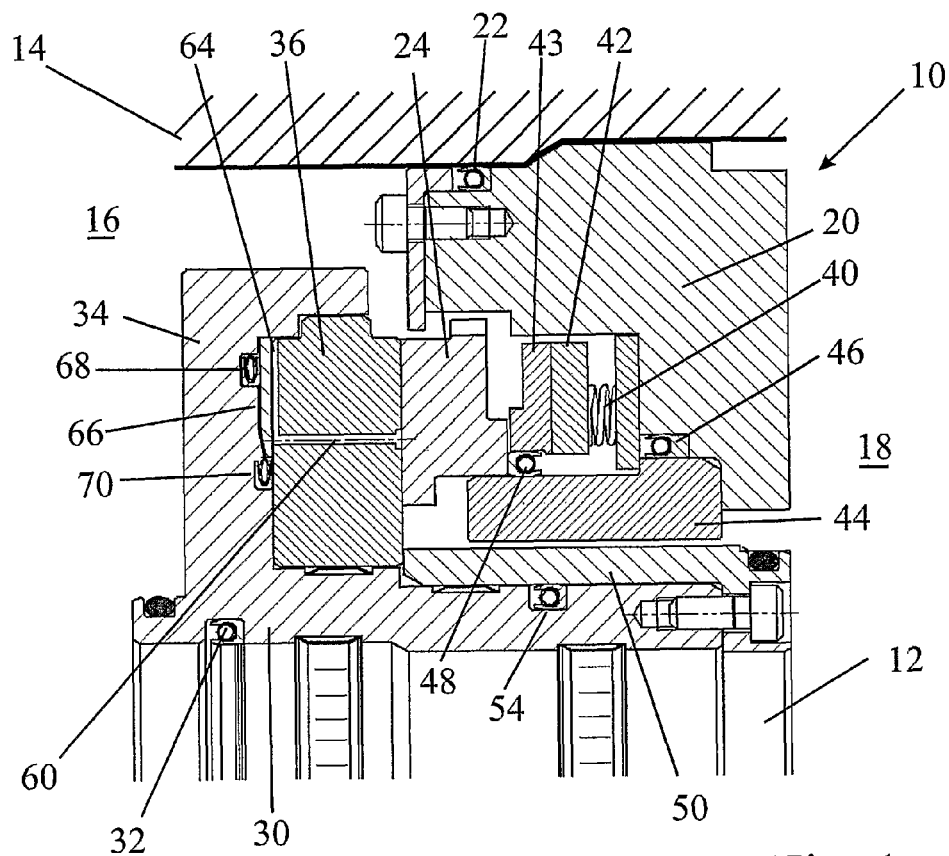
FIG. 1 is a section through a gas seal of the invention.

The drawing shows a gas seal module generally designated 10 arranged between the shaft 12 and housing 14 of a compressor. The seal is constructed as an assembly that is located at one end of the shaft 12 to prevent gas on the high pressure side 16 of the seal from escaping to the low pressure side 18 which may be under atmospheric pressure. The drawing shows a single seal assembly but it is not uncommon for two such seal assemblies to be arranged axially one behind the other to form a tandem seal.

The seal assembly comprises a non-rotating sealing member 24 and a rotating sealing member 36 which in operation are separated by a small sealing gap. The gap ensures that the sealing members do not wear but is small enough to limit the escape of gas from the high pressure side 16 to a small bleed that is required to maintain the gap between the two sealing members.

The two sealing members 24 and 36 form part of sub-assemblies or cartridges that can be slipped over the shaft 12 and into the end of the housing 14, respectively. The stationary sub-assembly includes an annular retainer 20 sealed relative to the housing 14 by means of a seal 22. As with the other seals to be mentioned below, the seal 22 is preferably a metal spring energised polymer (MSEP) seal, but it is alternatively possible to use an O-ring.

A balance diameter sleeve 44 is inserted into the retainer 20 and sealed relative to it by a seal 46. The sleeve 44 supports the non-rotating sealing member 24 while allowing it to move axially. A set of springs 40 acts on the sealing member 24 by way of a pair of rings 42, 43 which serve to distribute the spring forces evenly about the circumference of the sealing member 24 and are sealed relative to the balance diameter sleeve 44 by means of a further seal 48.

The area of the front face of the sealing member 24 that faces the sealing member 36 is larger than the area on its opposite side exposed to high gas pressure. This imbalance in the diameters creates a net force that urges the sealing member 24 in a direction to increase the width of the sealing gap. This force is opposed by the springs 40 which act to reduce the gap.

The rotating sub-assembly, on the other hand, comprises a sleeve 30 that is mounted on the shaft 12 and sealed relative to it by means of a seal 32. The sleeve has a radially projecting collar 34 which supports the sealing member 36 that rotates with the shaft 12. The sealing member 36 is held against the support collar 34 by means of a locking sleeve 50 which is secured axially to the end of the sleeve 30. The locking sleeve 50 is slightly spaced from the sealing member 36 and a further seal 54 is arranged between it and the sleeve 30. A bleed arrangement as will be described in more detail below allows gas from the high pressure side to bleed from the rear face of the sealing member 36 into the sealing gap between the members 24 and 36.

As so-far described the gas seal is known, as is its principle of operation, from GB 2 375 148. Gas from the high pressure side acts to urge the sealing members 24 and 36 apart with a force that decreases as the gap increases. At the same time, the springs 40 act to close the gap and the balance of forces is to maintain a small clearance that is sufficient to save wear but is effective in limiting the leakage of the gas from the high pressure side to ambient.

To operate effectively, the gas seal requires a bleed arrangement that accurately controls the gas flow to the gap between the sealing members 24 and 36. This is achieved in the embodiment of the invention shown in FIGS. 1 to 3 by forming three axial bores 60 in the sealing member 36 that communicate with three circumferential distribution grooves 62 on the front face of the sealing member (see FIG. 3) and with three radial grooves 64 that are etched into the rear face of the sealing member 36 (see FIG. 2). A flexible plate 66, also herein referred to as a shim, is separable from the sealing member 36 and is urged by an MSEP seal 68 against the rear face of the sealing member 36. A further MSEP seal 70 seals between the sealing member 36 and the collar 34. The shim 66 is sufficiently flexible to conform to the accurately machined rear surface of the sealing member 36 and to close the grooves.

The etched grooves 64 are only a few microns deep and therefore act as an effective throttle to limit the volume of gas that can flow to the gap between the sealing members. At low pressures, the spring of the MSEP seal 68 is alone sufficient to maintain the shim 66 in sealing contact with the rear face of the sealing member 36. This spring force is supplemented by the gas pressure acting on the shim 66 so that it is firmly held in place when the gas pressure increases.

The following dimensions have been found to be suitable and are given by way of example.

Effective depth of bleed groove 64: 4-20 microns

With of bleed groove 64: 2-10 microns

Depth of distribution groove 62: 5-200 microns

Radial width of distribution groove 62: 0.5-2 mm

The distribution grooves 62 are capable of sustaining unequal pressures and divide the sealing member 36 into sectors. The pressures in the grooves 62 responds inversely to the gap over the sectors and causes the axial separating force of each sector to respond in an inverse fashion. In that way any inclination of the sealing members 36 and 24 invokes a restoring moment.

Figure 2:
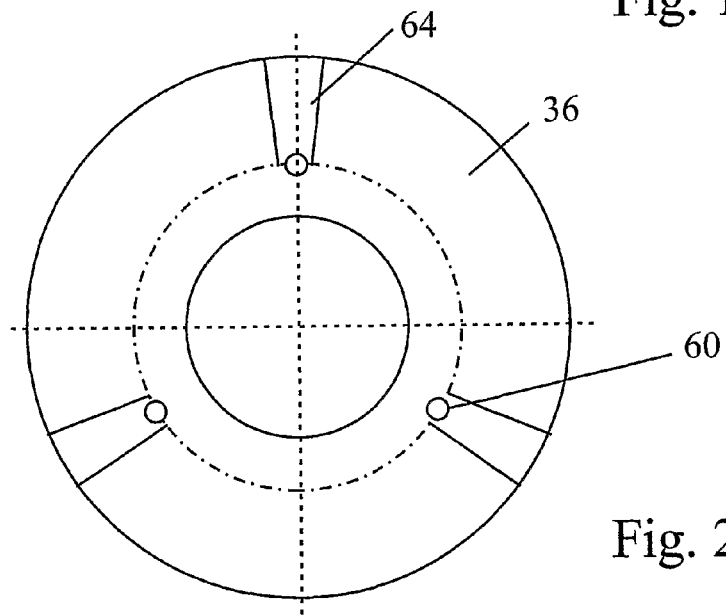
FIG. 2 is a view of the rear face of the rotating sealing member in FIG. 1.
Figure 3:
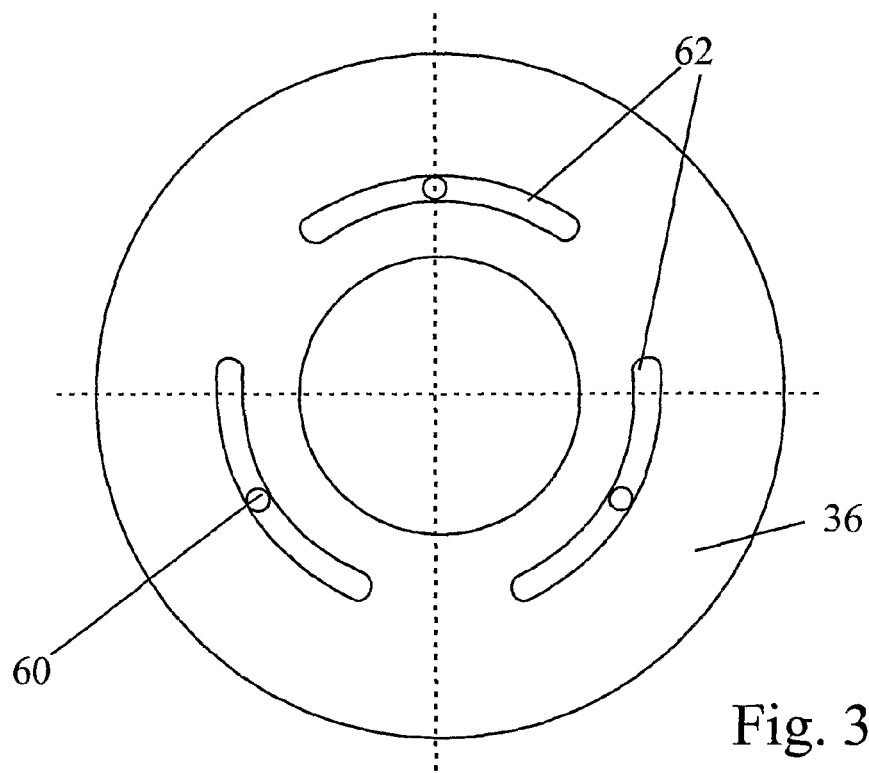
FIG. 3 is a view of the front face of the rotating sealing member in FIG. 1.
Figure 4:
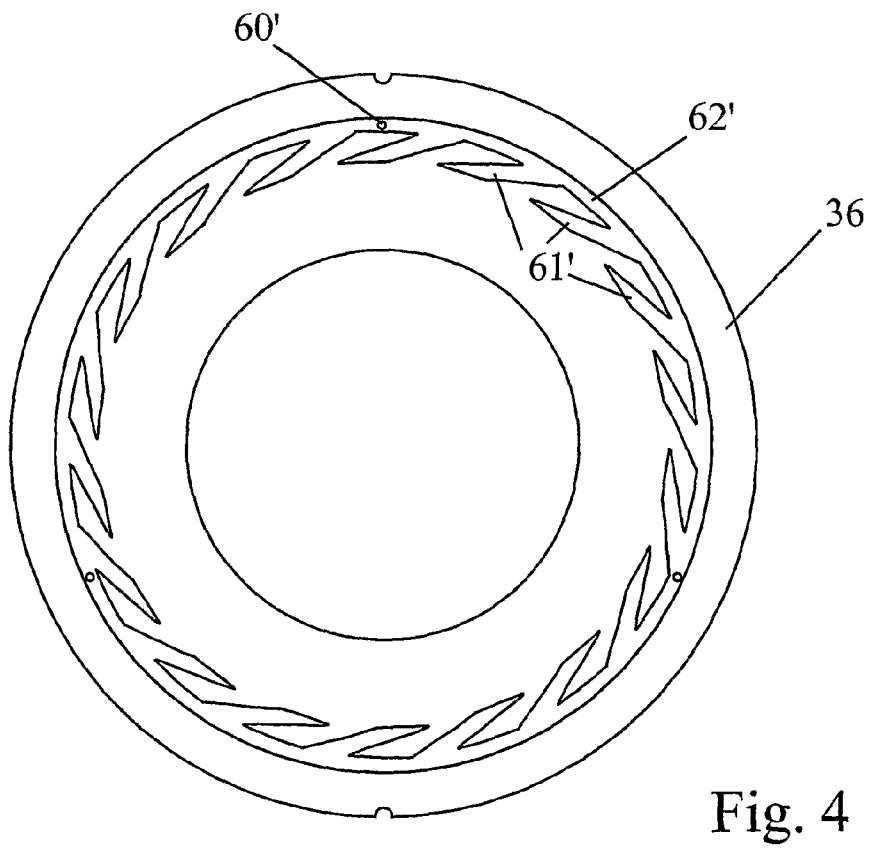
FIG. 4 is a view of the front face of the rotating seal member of an alternative embodiment of the invention.

The seal design of FIGS. 1 to 3 relies exclusively on hydrostatic effects to maintain the gap between the sealing members 24 and 36. It is alternatively possible, if desired, to supplement hydrodynamically the force acting to separate the sealing members. An embodiment operating in this manner is shown in FIG. 4. In FIG. 4, three axial bores 60' open into a continuous annular distribution groove 62'. Additionally, grooves 61' extending generally radially inwards of the distribution groove 62' serve to provide hydrodynamic lift. The grooves 61' may be spiral, as illustrated, or radial.

The above described seal has particular benefits when used in compressors and gas turbines which have a shaft diameter in excess of 5 cms. The seal is of a radial design with the process gas being located at the outside diameter of the sealing gap and the atmospheric gas at the inside diameter of the sealing gap. Of course, the converse could equally apply, that is to say the process gas may act on the inside diameter.

The ability of the gas seal to maintain a sealing gap under all conditions, results in extremely low torque during full pressure stops and starts. This in turn eliminates face lock up and subsequent damage to the seal parts.

The invention claimed is:

1. A gas seal assembly comprising:

a pair of mutually rotatable sealing members each of which has a front face adjacent a gap between the two members which constitutes a leakage path through the seal assembly, the members being urged, in use, in a direction to close the gap, and a gas bleed arrangement for allowing gas from a high pressure side of the seal to bleed into the gap so as to apply a force tending to separate the members, the gas bleed arrangement comprising:

a bore extending between the front face and a rear face of one of the sealing members, a generally radial groove formed in the rear face of the sealing member, a plate overlying the rear face to cover the groove and thereby define between the rear face of the sealing member and the plate a bleed passage connecting the bore to a high pressure side of the seal, and spring means to urge the plate into sealing contact with the rear face of said one of the sealing members, wherein the plate is formed as a shim that is sufficiently flexible to be deflected by the gas pressure into mating contact with the rear face of the sealing member so as to confine the gas flow of the bleed passage to the radial groove, and the spring means being sufficient to maintain the plate in sealing contact with the rear face of the sealing member at low pressure, the sealing member formed with a grooved rear face is associated with a rotatable shaft and the second sealing member is associated with a stationary casing, and said second sealing member is spring loaded to urge it in a direction tending to close the gap.

2. The gas seal assembly of claim 1, wherein the groove in the rear face of the sealing member is formed by etching.

3. The gas seal assembly of claim 1, further comprising a seal ring for sealing between said second member and the casing.

4. The gas seal assembly of claim 1, wherein the bore cooperates with formations in said front face to distribute the bleed gas over said front face.

5. The gas seal assembly of claim 4, wherein said formations comprise at least one generally arcuate groove in said front face.

6. The gas seal assembly of claim 4, wherein the formations in said front face include generally radial grooves serving to generate additional hydrodynamic lift.

7. A gas seal assembly comprising:

a first sealing member associated with a rotatable shaft, the first sealing member having a front face and a rear face and being formed with a bore extending between the front face and the rear face and with a generally radial groove in the rear face, a second rotatable sealing member associated with a stationary casing, the second sealing member having a front face that confronts the front face of the first sealing member across a gap which constitutes a leakage path through the seal assembly, a first spring element urging the second sealing member in a direction tending to close the gap, a plate overlying the rear face of the first sealing member to cover the groove and thereby define between the rear face of the first sealing member and the plate a bleed passage connecting the bore to a high pressure side of the seal, the plate being formed as a shim that is sufficiently flexible to be deflected by the gas pressure into mating contact with the rear face of the first sealing member so as to confine the gas flow of the bleed passage to the radial groove, and a second spring element urging the plate into sealing contact with the rear face of the first sealing member, the second spring element being sufficient to maintain the plate in sealing contact with the rear face of the sealing member at low pressure, whereby gas from a high pressure side of the seal is able to bleed into the gap so as to apply a force tending to separate the first and second sealing members.

8. The gas seal assembly of claim 7, wherein the groove in the rear face of the first sealing member is formed by etching.

9. The gas seal assembly of claim 7, wherein the bore cooperates with formations in said front face to distribute the bleed gas over said front face.

10. The gas seal assembly of claim 9, wherein said formations comprise at least one generally arcuate groove in said front face.

11. The gas seal assembly of claim 9, wherein the formations in said front face include generally radial grooves serving to generate additional hydrodynamic lift.

* * * * *